July 13, 1926.

V. C. DE YBARRONDO 1,592,407

APPARATUS FOR MEASURING THE INTENSITY OF LIGHT

Original Filed March 29, 1921  2 Sheets-Sheet 1

INVENTOR.
VINCENT C. DE YBARRONDO,
BY Graham + Davis
ATTORNEY.

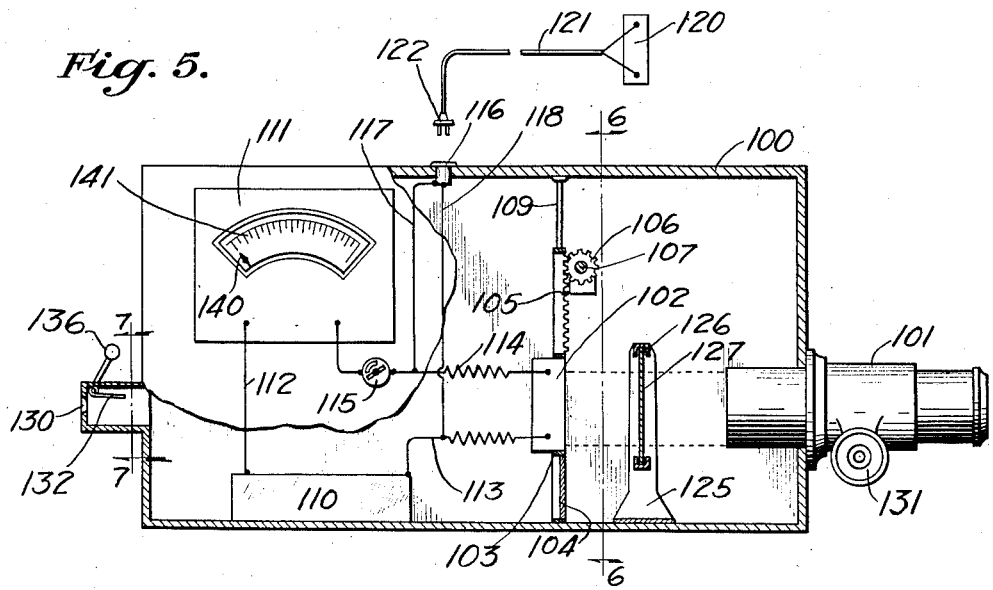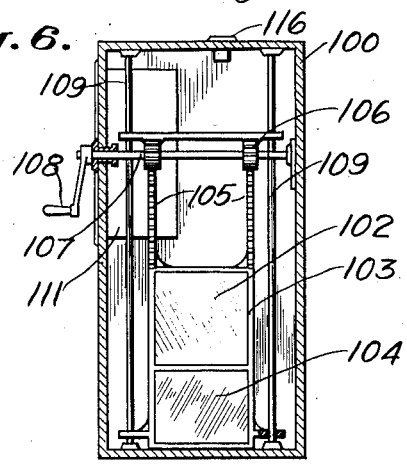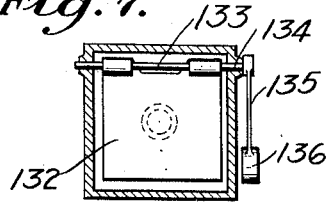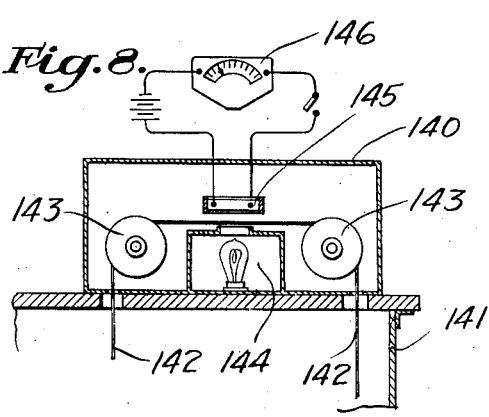

Patented July 13, 1926.

1,592,407

UNITED STATES PATENT OFFICE.

VINCENT C. DE YBARRONDO, OF LOS ANGELES, CALIFORNIA.

APPARATUS FOR MEASURING THE INTENSITY OF LIGHT.

Application filed March 29, 1921, Serial No. 456,740. Renewed May 10, 1926.

This invention relates to those commercial arts wherein light is used to perform certain functions pertaining thereto, and relates particularly to the photographic industries and more particularly to the manufacture of motion picture films.

It is the object of my invention to provide apparatus whereby the element of chance may be eliminated from the processes of printing, developing, and photographing of motion pictures.

In the present state of the art above referred to, success in the production of an article of quality is wholly dependent upon the skill and judgment of the operators performing the different operations through which the production of motion picture film must be carried.

I attain the object of my invention in the provision of apparatus, to be used in connection with the processes of printing, developing and photographing of motion picture films, by which it is possible to measure and register the intensity of the light being used and thereby to make it possible for the operators to adjust such instruments as they may be using, thereby conforming the operation upon the film to certain predetermined standards and assuring a uniform product.

Referring to the drawings which are diagrammatic and for illustrative purposes only and intended merely for the presentation of the embodiment of my invention:

Fig. 5 is a side elevation of the apparatus I employ in connection with photographing of motion pictures, and is in partial section to better illustrate the interior arrangement; the electrical connections being shown in diagrammatic form.

Fig. 6 is a section taken on a plane represented by the line 6—6 of Fig. 5.

Fig. 7 is a section taken on a plane represented by the line 7—7 of Fig. 5.

Fig. 8 is a vertical section showing in diagrammatic form the application of my apparatus to uses wherein it is desired to check the condition of different portions of a continuous length of film.

In the printing of motion picture films as present practiced results obtained are dependent entirely upon the skill of the operator in judging the proper amount of exposure to give in the printing of the positives from each separate negative, as the degree to which these negatives have been developed varies in each instance.

Figure 1:
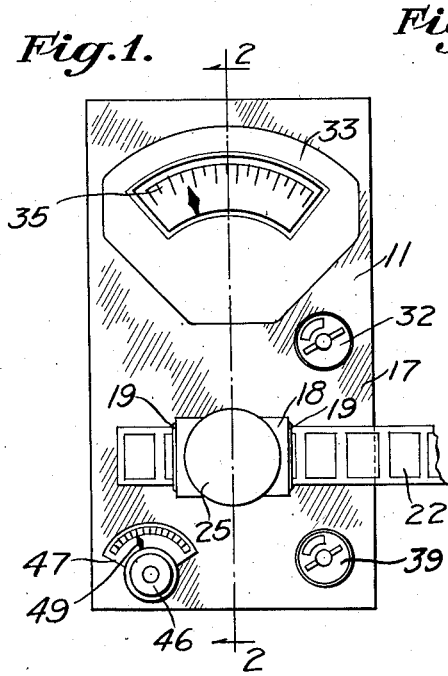
Fig. 1 is a front elevation of the apparatus I employ in connection with the printing of positive films.
Figure 2:
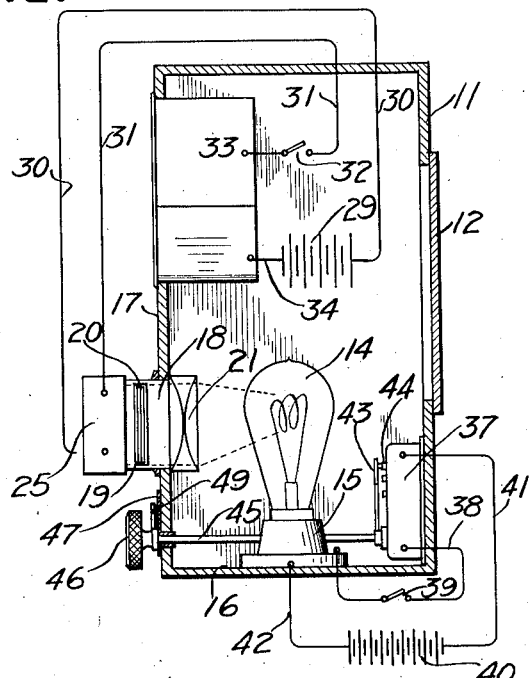
Fig. 2 is a section taken on a plane represented by the line 2—2 of Fig. 1, in which the electrical connections are shown diagrammatically.

In my invention I measure the opacity of the film under consideration by the use of the apparatus shown in Figs. 1 and 2, thereby making it possible to predetermine the proper amount of exposure to use.

A light proof box 11 having a door 12 is provided with a light globe 14 mounted in a socket 15 which is supported upon the bottom 16 of the box 11. Mounted in the front 17 of the box 11 is a tube 18 having oppositely disposed slots 19 through which a length of film to be tested may be passed. These slots 19 are preferably edged with felt 20 to prevent the admittance of light and also to protect the film being tested. Upon the inner end of the tube 18 is mounted a condenser 21 which directs the light rays from the filament of the globe 14 through the tube 18, in which has been previously placed a film 22, and the light rays are received by a cell 25 of some substance such as selenium, which has the characteristics of varying in electrical conductivity when exposed to different degrees of light. An amount, or degree, of light varying with the opacity of the film through which it is passed falls upon the selenium cell 25 and increases its conductivity to an extent corresponding to the degree of light. This virtue of varying conductivity is employed to measure the degree of light to which it is subjected by passing an electrical current through the cell and employing in series therewith an instrument, such as a galvanometer, to measure the strength of current flowing.

From a battery, or other source, a wire 30 makes connection with the selenium cell 25 and a wire 31 having in it a switch 32 connects between the cell 25 and a galvanometer 33, and a complete circuit is formed by a wire 34 which connects between the battery 29 and the galvanometer 33. The dial 35 may be calibrated to read directly the candle power corresponding to the current flowing, or a standard instrument, reading in amperes, may be used and the intensity of light which penetrates the film may be determined from a table or chart giving the relative values of the current flowing and the intensity of the light required to cause such flow through the selenium cell, such data having been previously determined by experimentation.

As a means of regulating the intensity of the light being supplied by the globe 14 I employ a resistance box 37 in circuit with said globe through a wire 38 in which is located a switch 39 and which has connection with a battery 40 or other source of supply, through wires 41 and 42. The lever 43 of the resistance box 37, which makes contact with the several resistance coil terminals 44, is mounted upon a shaft 45 extending through the front 17 of the box 11, and which supports upon its extended end a thumb-knob 46. A dial 47, calibrated to correspond with the number of coils in the resistance box 37, is mounted upon the front 17 of the box 11, as shown, and the number of coils in circuit with the globe and battery is indicated by a pointer 49 extending from the knob 46.

It is necessary at intervals throughout the operation of developing films to note the extent that the development has progressed, and from time to time a portion of the film being developed is drawn from the developing tank and viewed under proper light conditions. Under present conditions the extent to which the developer is allowed to act upon the film must necesarily be left to the judgment of the operator.

In the use of my apparatus the opacity of the film may be determined throughout different stages of the process, and the condition of the product may be made to adhere to standards as predetermined by experimentation.

Figure 3:
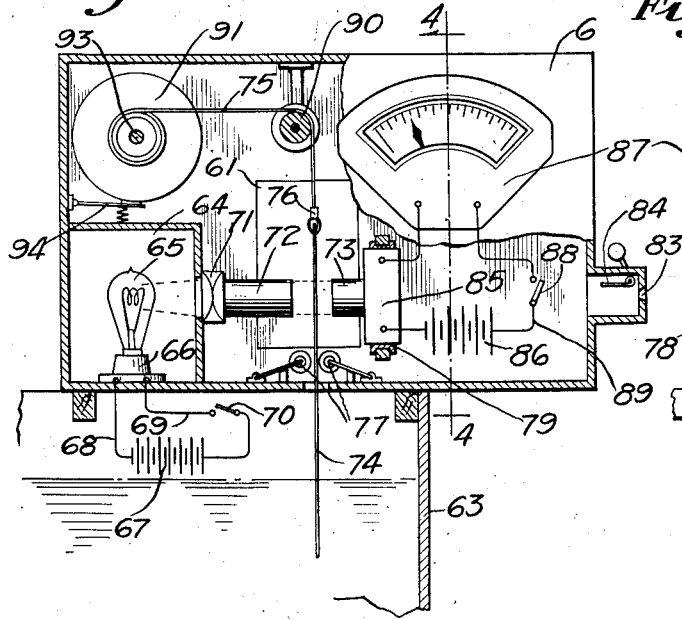
Fig. 3 is a side elevation of the apparatus I employ in conjunction with the developing of films, and is in partial section to expose the interior arrangement in which the electrical connections are also shown diagrammatically.
Figure 4:
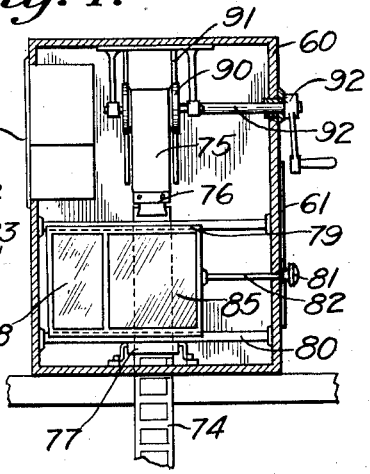
Fig. 4 is a section taken on a plane represented by the line 4—4 of Fig. 3.

In this division of the manufacture of motion picture films I employ the apparatus shown in Figs. 3 and 4 which comprises a box 60, having a door 61, and which is adapted to be mounted upon a developing tank 63. Within the box 60 is formed a light compartment 64 in which is located a globe 65 mounted in a socket 66 and having connection with a battery 67 through a wire 68 and a wire 69 in which is located a switch 70.

A condenser 71 is mounted upon the light chamber 64 and directs the rays of light from the filament of the light globe 65 through the opposing tubes 72 and 73 between which the film to be inspected 74 is caused to pass. As an aid to handling the length of film 74 I provide a leader 75 adapted to grip the end of the film by means of a clip 76, whereupon it may be drawn up through guide rollers 77 and exposed to inspection before a magnifying glass 78 mounted in a frame 79 which may be moved back and forth in slides 80 by the use of a knob 81 connected to the frame 79 by a rod 82.

The film is viewed before the magnifying glass 78 through a sight hole 83 before which is mounted a pivoted shutter 84. Upon inspection through the sight hole 83 and having determined that the film is properly placed before the tubes 72 and 73, the frame 79 is moved to bring a selenium cell 85, also mounted in the frame 79, into alignment before the tubes 72 and 73, as shown in Fig. 4.

The selenium cell 85 is in circuit with a battery 86 and a registering instrument, such as a galvanometer 87, and a switch 88, and the connection between these different parts is provided for by the wires 89. As selenium has the quality of varying in conductivity when subjected to light of different intensities, the current allowed to pass through the selenium cell will be proportionate to the intensity of the light permitted to pass through the film 74.

The leader 75 runs over a guide roller 90 and is attached to a spool 91 around which it is wound by turning a crank 92 mounted on a shaft 93 on which the spool 91 is also mounted, and the spool is prevented from turning freely by a brake 94, therefore it is possible to maintain the film in any desired position.

As shown in Fig. 8, for use in checking the condition of different points in a continuous film, I provide a box 140 which is mounted on a developing or printing cabinet 141 and the length of film 142 passes over rollers 143, and is conducted between a light box 144 and a selenium cell 145 and the opacity of the portion of the film exposed is register on a galvanometer 146.

In photography, and more especially in the photography of motion pictures, due to the variation in light conditions, it is exceedingly difficult to determine the correct setting of the diaphragm of the camera to allow the right amount of light for the speed of film being used; and the same condition exists as that found throughout the other branches of the production of motion picture film, that of entire dependence upon the skill of the operator in judging the intensity of the light.

With the use of my apparatus, as shown in Figs. 5 and 6, it is possible to determine the intensity of the existing light and to adjust the camera stops accordingly, thereby eliminating any possible chance of error due to mistaken judgment on the part of the operator.

In this apparatus I employ a light tight box 100 provided with an objective 101. Within the box 100 is a selenium cell 102 mounted in a frame 103 with a ground glass screen 104. Racks 105 formed upon the upper portion of the frame 103 are engaged by gears 106 mounted on a shaft 107 extending without the box 100 and having mounted thereupon a crank 108, the operation of which will cause the raising or lowering of the frame 103 upon the slide rods 109 and either the selenium cell or the ground glass screen may be brought into alignment with the objective.

Connection between a battery 110 and a current registering instrument, such as a galvanometer 111, is made through a wire 112, and between the battery 110 and the selenium cell 102 through a wire 113, and a complete circuit is formed by a wire 114 in which is placed a switch 115. A receptacle 116 connected into circuit with the battery and the galvanometer through the wires 117 and 118, provides a means for the external use of the selenium cell as indicated at 120 by making external connection therewith through a cord 121 and a plug 122.

A frame 125 provides slides 126 in which may be placed a color filter 127 for use in connection with such a color filter over the camera lens for the obtaining of certain effects.

When it is desired to determine light conditions, the frame 103 is raised to bring the ground glass screen 104 into alignment with the objective, and by sighting through a sight hole 130, the objects to be photographed may be focused upon the screen 104 by the use of a thumb wheel 131. The sight hole 130 is ordinarily covered by a shutter 132 which is preferably of some rigid substance so that it may be supported upon a shaft 133. Upon the extension 134 of the shaft 133 is mounted an arm 135 having on its extremity a weight 136. The downward action of the weight 136 maintains the shutter 132 in a closed position, and also provides a means of opening the shutter when it is desired to view the projection upon the screen 104. When the objective have been properly focused, the frame 103 is lowered to the position shown in Fig. 5, thereby subjecting the selenium cell 102 to the light before projected upon the screen 104.

The variable conductivity of selenium is in this application employed to vary the strength of the current passing through the circuit of which it is a part, the strength current is indicated by the pointer 140 on the dial 141 of the galvanometer 111 and thereby relative measurement of the light focused upon the selenium cell may be obtained.

The dial 141 may be calibrated to read the diaphragm setting direct, or any standard instrument may be used and the proper setting of the camera obtained by referring to a table of standards in which the different settings of the diaphragm are given together with their corresponding ammeter readings.

I claim as my invention:

In a light measuring instrument, the combination of: a box; walls forming light chamber within said box; a light within said light chamber; means mounted on said light chamber to project a shaft of light within said box; a frame slidably mounted with said box; a selenium cell mounted in said frame; a magnifying glass mounted in said frame; means projecting through side of said box whereby said frame may be moved to bring either said cell or said magnifying glass before said shaft of light; means for viewing a film through said magnifying glass from exterior of said box; a current registering instrument mounted in said box; an electric circuit including a battery, a switch, said cell, and said current registering instrument; and means for passing a film before said light projecting means.

In testimony whereof, I have hereunto set my hand at Los Angeles, California, this 23rd day of March 1921.

VINCENT C. DE YBARRONDO.